United States Patent
Person

(10) Patent No.: US 10,622,117 B2
(45) Date of Patent: Apr. 14, 2020

(54) POLYMERIC COMPOSITIONS WITH VOLTAGE STABILIZER ADDITIVE

(71) Applicant: Union Carbide Corporation, Seadrift, TX (US)

(72) Inventor: Timothy J. Person, Freehold, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 0 days.

(21) Appl. No.: 15/935,173

(22) Filed: Mar. 26, 2018

(65) Prior Publication Data

US 2018/0218806 A1  Aug. 2, 2018

Related U.S. Application Data

(62) Division of application No. 15/165,623, filed on May 26, 2016, now Pat. No. 10,163,545, which is a division of application No. 13/822,114, filed as application No. PCT/US2011/052916 on Sep. 23, 2011, now abandoned.

(60) Provisional application No. 61/388,260, filed on Sep. 30, 2010.

(51) Int. Cl.
| | |
|---|---|
| *H01B 7/02* | (2006.01) |
| *C08K 5/06* | (2006.01) |
| *C08K 5/20* | (2006.01) |
| *H01B 3/44* | (2006.01) |
| *C09D 7/63* | (2018.01) |
| *H01B 3/30* | (2006.01) |
| *C09D 123/06* | (2006.01) |

(52) U.S. Cl.
CPC ................ *H01B 7/02* (2013.01); *C08K 5/06* (2013.01); *C08K 5/20* (2013.01); *C09D 7/63* (2018.01); *C09D 123/06* (2013.01); *H01B 3/307* (2013.01); *H01B 3/441* (2013.01)

(58) Field of Classification Search
CPC ......... H01B 7/02; H01B 3/441; C09D 123/06
See application file for complete search history.

(56) References Cited

U.S. PATENT DOCUMENTS

| | | | |
|---|---|---|---|
| 3,445,394 A | 5/1969 | Hunt | |
| 3,522,183 A | 7/1970 | Heidt | |
| 3,542,684 A | 11/1970 | Hunt | |
| 3,644,267 A | 2/1972 | Jackson et al. | |
| 3,933,772 A | 1/1976 | Takahashi et al. | |

(Continued)

FOREIGN PATENT DOCUMENTS

| | | |
|---|---|---|
| EP | 2072569 A1 | 6/2009 |
| EP | 2072576 A1 | 6/2009 |

(Continued)

OTHER PUBLICATIONS

Structure of 1,3-diphenoxybenzene.
Randall, Rev. Macromol. Chem. PHys., C29(2&3), 201-317 (1989).

*Primary Examiner* — Hai Vo
(74) *Attorney, Agent, or Firm* — Quarles & Brady LLP

(57) ABSTRACT

Disclosed are polymeric compositions with improved breakdown strength. The polymeric compositions contain a polyolefin and a voltage stabilizing agent. The voltage stabilizing agent is a diphenoxybenzene and/or a benzanilide. The present polymeric compositions exhibit improved breakdown strength when applied as an insulating layer for power cable.

5 Claims, 2 Drawing Sheets

(56) References Cited

U.S. PATENT DOCUMENTS

| | | | |
|---|---|---|---|
| 3,936,523 A * | 2/1976 | Kleeberg | C08K 5/3492 |
| | | | 264/211 |
| 5,246,783 A | 9/1993 | Spenadel et al. | |
| 5,272,236 A | 12/1993 | Lai et al. | |
| 5,278,272 A | 1/1994 | Lai et al. | |
| 5,986,028 A | 11/1999 | Lai et al. | |
| 6,496,629 B2 | 12/2002 | Ma et al. | |
| 6,696,154 B2 | 2/2004 | Martinotto et al. | |
| 6,714,707 B2 | 3/2004 | Rossi et al. | |
| 6,879,861 B2 | 4/2005 | Benz et al. | |
| 2008/0261722 A1 | 10/2008 | Bulpett et al. | |
| 2008/0269416 A1 * | 10/2008 | Timberlake | C07C 43/29 |
| | | | 525/132 |
| 2009/0143531 A1 | 6/2009 | Ouhadi et al. | |
| 2010/0160516 A1 * | 6/2010 | Timberlake | C08K 5/06 |
| | | | 524/371 |

FOREIGN PATENT DOCUMENTS

| | | |
|---|---|---|
| EP | 2163576 A1 | 3/2010 |
| GB | 1128724 A | 10/1968 |
| JP | S50-158637 A | 12/1975 |
| WO | 98/13428 A1 | 4/1998 |

\* cited by examiner

POLYMERIC COMPOSITIONS WITH VOLTAGE STABILIZER ADDITIVE

BACKGROUND

A typical power cable includes one or more conductors in a cable core surrounded by one or more layers of polymeric material. Medium voltage (6 to 36 kV) and high voltage (higher than 36 kV) and extra high voltage (greater than 220 kV) cable typically includes a core surrounded by an inner semiconducting layer, followed by an insulating layer, and then an outer semiconducting layer.

The load-carrying capacity of a cable system is limited, in part, by the heat transfer away from the conductor. Polyolefins, such as polyethylene, are frequently utilized in the insulating layer and/or in the semiconducting layer. Polyethylene has a low dielectric permittivity and a relatively high electrical breakdown strength.

Known are voltage stabilizing agents for polyolefin compositions that increase electrical breakdown strength of insulating layers in power cable. Conventional voltage stabilizing agents, however, have poor compatibility with polyolefins. The art recognizes the continuous need for voltage stabilizing agents compatible with polyolefins for (i) increased electrical breakdown strength of cable insulation material, (ii) increased reliability with existing cable designs and/or (iii) provision of high-stress designs that are able to deliver increased amounts of energy.

SUMMARY

The present disclosure is directed to polymeric compositions with improved electrical breakdown strength. The present polymeric compositions are composed of (i) a polymeric component and (ii) a voltage stabilizing agent (VSA) and exhibit improved electrical breakdown strength and increased endurance to high electrical stress. The present voltage stabilizing agent can be melt-mixed with polyolefin and can be functionalized via established chemistries to further improve compatibility with polyolefin, and increase electrical breakdown strength to the polyolefin, while imparting little impact on crosslinking chemistry typically practiced in power cable insulating compositions. The present polymeric compositions find use as an insulating layer in wire and cable applications and power cable in particular.

In an embodiment, a polymeric composition is provided and includes a polymeric component and a voltage stabilizing agent. The polymeric component is a polyolefin. The voltage stabilizing agent is a diphenoxybenzene. The diphenoxybenzene has the structure (I).

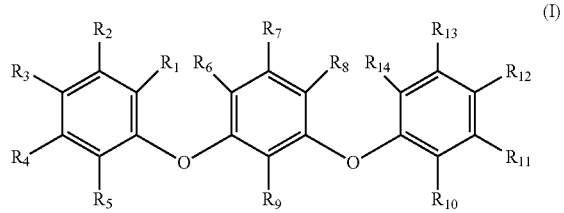

$R_1$-$R_{14}$ are the same or different. Each of $R_1$-$R_{14}$ is selected from hydrogen, a $C_1$-$C_{20}$ hydrocarbyl group, a substituted $C_1$-$C_{20}$ hydrocarbyl group, and combinations thereof.

In an embodiment, another polymeric composition is provided and includes a polymeric component and a voltage stabilizing agent. The polymeric component is a polyolefin. The voltage stabilizing agent is a benzanilide. The benzanilide has the structure (II).

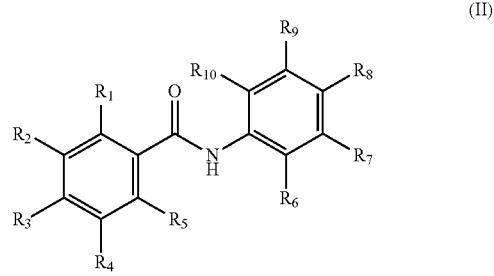

$R_1$-$R_{10}$ are the same or different. Each of $R_1$-$R_{10}$ is selected from hydrogen, a $C_1$-$C_{20}$ hydrocarbyl group, a substituted $C_1$-$C_{20}$ hydrocarbyl group, and combinations thereof.

In an embodiment, the polymeric composition includes a polyolefin and a voltage stabilizing agent that is a mixture of the diphenoxybenzene (I) and the benzanilide (II).

The present disclosure provides a coated conductor. In an embodiment, a coated conductor is provided and includes a conductor and a coating on the conductor. The coating includes any of the foregoing polymeric compositions. In other words, the coating contains a (i) polyolefin and (ii) a voltage stabilizing agent that is a diphenoxybenzene of structure (I) and/or a benzanilide of structure (II).

An advantage of the present disclosure is a polymeric composition with improved breakdown strength.

An advantage of the present disclosure is a voltage stabilizing agent with improved compatibility with polyolefin.

An advantage of the present disclosure is a voltage stabilizing agent that reduces electrical treeing in a polymeric composition.

DETAILED DESCRIPTION

Figure 1:
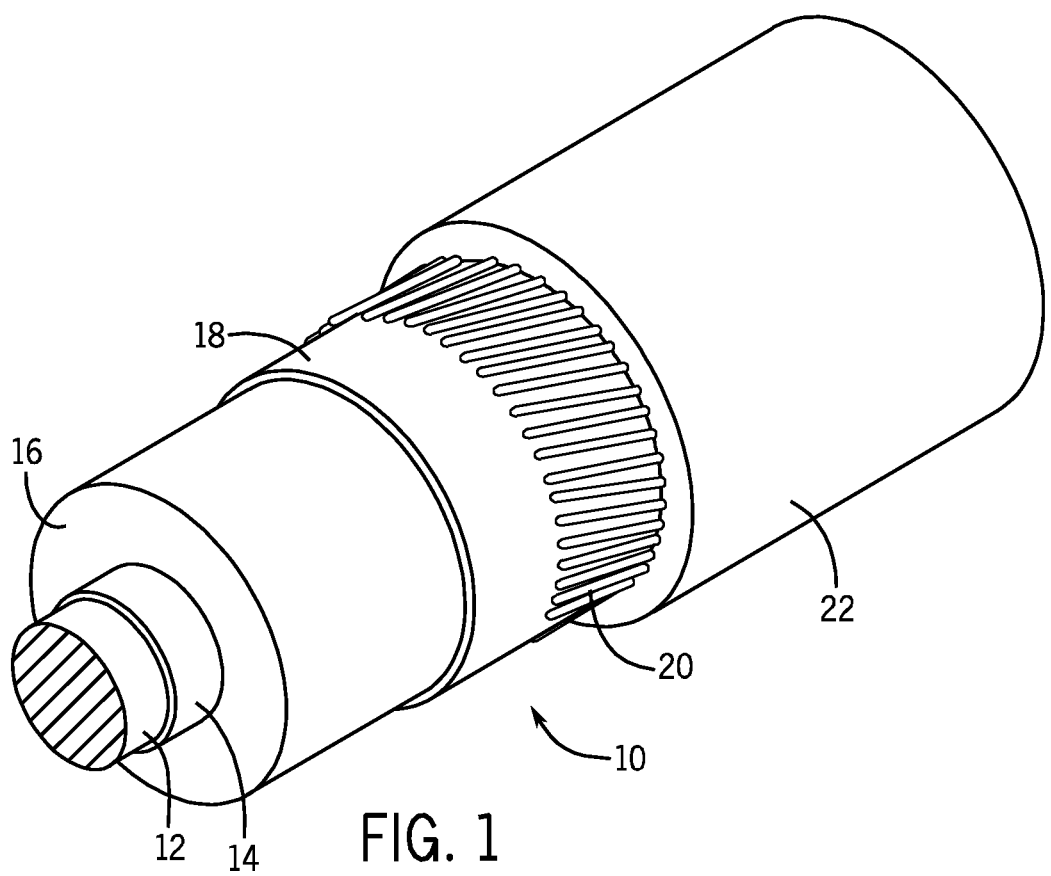
FIG. 1 is a perspective view of a power cable in accordance with an embodiment of the present disclosure.

The present disclosure provides a polymeric composition. The polymeric composition includes (i) a polymeric component, (ii) a voltage stabilizing agent, and (iii) optionally other additives.

The polymeric component may include thermoplastics and/or thermoset material (such as silicone rubber). The polymeric component may be crosslinked or may be non-crosslinked. Nonlimiting examples of suitable thermoplastics include, polyurethanes, polyolefins, polyacetals, polycarbonates, vinyl polymers, polyamides, polyimides, acrylics, polystyrenes, polysulfones, polyetherketones, cellulosics, polyesters, polyethers, fluoropolymers, and copolymers thereof such as olefin-vinyl copolymers, olefin-allyl copolymers and copolymers of polyethers and polyamides. Examples of vinyl polymers include polyvinyl chloride, polyvinyl acetate, vinyl chloride/vinyl acetate copolymers, polyvinyl alcohol and polyvinyl acetal.

When it is desired to use a crosslinked polymeric component, crosslinking can be accomplished by one or more of the following nonlimiting procedures: free radical crosslinking (i.e., peroxide cross-linking); radiation cross-linking (electron accelerators, gamma-rays, high energy radiation, such as X-rays, microwaves, etc.); thermal crosslinking, and/or moisture cure crosslinking (i.e., silane-graft).

In an embodiment, the polymeric component is a polyolefin. Nonlimiting examples of suitable polyolefins are homopolymers and copolymers containing one or more $C_2$-$C_{20}$ α-olefins. For purposes of this disclosure, ethylene is considered an α-olefin. Nonlimiting examples of suitable α-olefins include ethylene, propylene, isobutylene, 1-butene, 1-pentene, 1-hexene, 4-methyl-1-pentene, and 1-octene. Nonlimiting examples of suitable polyolefins include ethylene-based polymer, propylene-based polymer, and combinations thereof. An "ethylene-based polymer", or "polyethylene" and like terms is a polymer containing at least 50 mole percent (mol %) units derived from ethylene. A "propylene-based polymer," or "polypropylene" and like terms is a polymer containing at least 50 mole percent units derived from propylene.

In an embodiment, the polymeric component is an ethylene-based polymer. The ethylene-based polymer may be ethylene homopolymer or an ethylene/α-olefin interpolymer. The α-olefin content is from about 5, or about 10, or about 15, or about 20, or about 25, wt % to less than 50, or less than about 45, or less than about 40, or less than about 35, wt % based on the weight of the interpolymer. The α-olefin content is measured by $^{13}$C nuclear magnetic resonance (NMR) spectroscopy using the procedure described in Randall (*Rev. Macromol. Chem. Phys., C29* (2&3)). Generally, the greater the α-olefin content of the interpolymer, the lower the density and the more amorphous the interpolymer, and this translates into desirable physical and chemical properties for the protective insulation layer.

The α-olefin is a $C_{3-20}$ linear, branched or cyclic α-olefin. Nonlimiting examples of suitable of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this disclosure certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this disclosure. Nonlimiting examples of suitable ethylene-based polymers include the following copolymers: ethylene/propylene, ethylene/butene, ethylene/1-hexene, ethylene/1-octene, ethylene/styrene, ethylene-vinyl acetate, ethylene-vinyl propionate, ethylene-vinyl isobutyrate, ethylene-vinyl alcohol, ethylenemethyl acrylate, ethylene-ethyl acrylate, ethylene-ethyl methacrylate, ethylene/butyl-acrylate copolymers (EBA), ethylene-allyl benzene, ethylene-allyl ether, and ethylene-acrolein; ethylene-propylene (EPR) or ethylene-propylene-diene (EPDM) rubbers; natural rubbers; butyl rubbers and the like.

Nonlimiting examples of suitable terpolymers include ethylene/propylene/1-octene, ethylene/propylene/butene, ethylene/butene/1-octene, ethylene/propylene/diene monomer (EPDM) and ethylene/butene/styrene. The copolymers/interpolymers can be random or blocky.

The ethylene-based polymer can be high density polyethylene (HDPE), medium density polyethylene, (MDPE), low density polyethylene, (LDPE), linear low density polyethylene (LLDPE), and/or very low density polyethylene (VLDPE). The ethylene-based polymers used in the practice of this disclosure can be used alone or in combination with one or more other ethylene-based polymers, e.g., a blend of two or more ethylene-based polymers that are "different from one another," which means the ethylene-based polymers are uncommon by way of at least one property such as: monomer/comonomer composition and content, melt index, melt temperature, degree of branching, catalytic method of preparation, etc. If the ethylene-based polymer is a blend of two or more ethylene-based polymers, then the ethylene-based polymers can be blended by any in-reactor or post-reactor process. The reactors can be charged with the same catalyst but operated at different conditions, e.g., different reactant concentrations, temperatures, pressures, etc, or operated at the same conditions but charged with different catalysts.

Examples of ethylene-based polymers made with high pressure processes include (but are not limited to) low density polyethylene (LDPE), ethylene vinyl acetate copolymer (EVA), ethylene ethyl acrylate copolymer (EEA), and ethylene silane acrylate terpolymers.

Nonlimiting examples of ethylene-based polymers include very low density polyethylene (VLDPE) (e.g., FLEXOMER® ethylene/1-hexene polyethylene made by The Dow Chemical Company), homogeneously branched, linear ethylene/α-olefin copolymers (e.g., TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and ethylene block copolymers (e.g., INFUSE® polyethylene available from The Dow Chemical Company). Substantially linear ethylene copolymer is described in U.S. Pat. Nos. 5,272,236, 5,278,272 and 5,986,028.

Voltage Stabilizing Agent

In addition to the polymeric component, the polymeric composition also includes a voltage stabilizing agent (or VSA). A "voltage stabilizing agent," as used herein, is a compound which reduces the damage to a polymeric material when exposed to an electric field. It has been considered that a VSA may trap or deactivate electrons to inhibit electrical treeing in an insulation material, or otherwise to provide effective screening of high localized fields (near defects or contaminants) to thereby reduce the energy and/or frequency of injected electrons which may impart damage to the polyolefin. Blending the VSA with the polymeric component inhibits or otherwise retards treeing. Bounded by no particular theory, it is believed the VSA fills and/or surrounds defects in the polymeric component, the defects being points of tree initiation. Defects include voids and/or impurities present in the polymeric component.

In an embodiment, the polymeric composition includes a (i) polyolefin, (ii) a voltage stabilizing agent that is a diphenoxybenzene, and (iii) optional additives. Diphenoxybenzene has the structure (I) below.

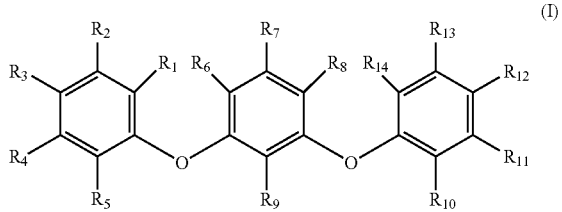

(I)

$R_1$-$R_{14}$ are the same or different. Each of $R_1$-$R_{14}$ is selected from hydrogen, a $C_1$-$C_{20}$ hydrocarbyl group, a substituted $C_1$-$C_{20}$ group, and combinations thereof. The hydrocarbyl group may be substituted or unsubstituted.

As used herein, the term "hydrocarbyl" or "hydrocarbon" is a substituent containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl-, and alkynyl-groups.

As used herein, the term "substituted hydrocarbyl" or "substituted hydrocarbon" is a hydrocarbyl group that is substituted with one or more nonhydrocarbyl substituent groups. A nonlimiting example of a nonhydrocarbyl substituent group is a heteroatom. As used herein, a "heteroatom" is an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group is a hydrocarbyl group that is substituted with one or more halogen atoms.

In an embodiment, the polyolefin is a polyethylene.

In an embodiment, the polyolefin is a crosslinked polyethylene.

In an embodiment, at least one of $R_1$-$R_{14}$ is a $C_1$-$C_{20}$ hydrocarbyl group.

In an embodiment, each of $R_1$-$R_{14}$ is hydrogen.

In an embodiment, the polymeric composition contains from about 0.1 wt %, or about 0.2 wt % to about 3 wt %, or about 1 wt % of the diphenoxybenzene. Weight percent is based on total weight of the polymeric composition.

The disclosure provides another polymeric composition composed of (i) a polymeric component and (ii) a VSA that is a benzanilide and (iii) optional additives. The polymeric component may be any polymeric component as disclosed above.

In an embodiment, the polymeric composition includes a polyolefin and the VSA is a benzanilide with the structure (II) below.

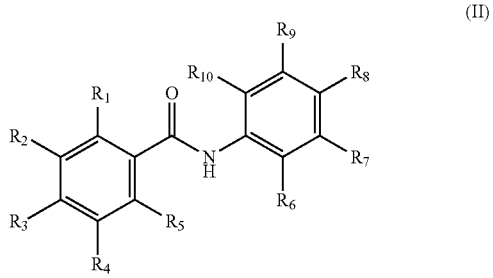

(II)

$R_1$-$R_{10}$ are the same or different. Each of $R_1$-$R_{10}$ is selected from hydrogen, a $C_1$-$C_{20}$ hydrocarbyl group, a substituted $C_1$-$C_{20}$ hydrocarbyl group, and combinations thereof. The hydrocarbyl group may be substituted or unsubstituted.

In an embodiment, the polyolefin is a polyethylene.

In an embodiment, the polyolefin is a crosslinked polyethylene.

In an embodiment, at least one of $R_1$-$R_{10}$ is a $C_1$-$C_{20}$ hydrocarbyl group.

In an embodiment, each of $R_1$-$R_{10}$ is hydrogen.

In an embodiment, the polymeric composition contains from about 0.1 wt % to about 3 wt % of the benzanilide. Weight percent is based on total weight of the polymeric composition.

The foregoing VSAs unexpectedly improve electrical breakdown strength in insulating layers containing the present polymeric compositions. The improvement in electrical breakdown strength can be seen in the increased breakdown voltages exhibited in Examples 1 and 2 described hereafter.

Moreover, the present VSAs exhibit good solubility in the polyolefin matrix and a low migration tendency. The present VSAs may also be effectively utilized with regard to other components of the polyolefin composition, and are compatible with cross-linking agents.

Additives

Any of the foregoing polymeric compositions may optionally contain one or more additives. Nonlimiting examples of suitable additives include antioxidants, stabilizers, processing aids, scorch retarders, and/or cross-linking boosters. As antioxidant, sterically hindered or semi-hindered phenols, aromatic amines, aliphatic sterically hindered amines, organic phosphates, thio compounds, and mixtures thereof, can be mentioned. Typical cross-linking boosters may include compounds having a vinyl or an allyl group, e.g. triallylcyanurate, triallylisocyanurate, and di-, tri- or tetra-acrylates. As further additives, flame retardant additives, acid scavengers, inorganic fillers, water-tree retardants and other voltage stabilizers can be mentioned A "scorch retarder," as used herein is a compound that reduces the formation of scorch during extrusion of a polymer composition, at typical extrusion temperatures used, when compared to the same polymer composition extruded without said compound. Besides scorch retarding properties, the scorch retarder may simultaneously result in further effects like boosting, i.e. enhancing cross-linking performance during the cross-linking step.

The polymeric composition may comprise two or more embodiments disclosed herein.

Coated Conductor

The present disclosure provides articles containing the present polymeric compositions. In an embodiment, the article includes a conductor and a coating on the conductor. This forms a coated conductor. The conductor may be a single cable or a plurality of cables bound together (i.e., a cable core, or a core). The coated conductor may be flexible, semi-rigid, or rigid. Nonlimiting examples of suitable coated conductors include flexible wiring such as flexible wiring for consumer electronics, a power cable, a power charger wire for cell phones and/or computers, computer data cords, power cords, appliance wiring material, and consumer electronic accessory cords.

A coating is located on the conductor. The coating may be one or more inner layers such as an insulating layer and/or a semiconducting layer. The coating may also include an outer layer (also referred to as a "jacket" or a "sheath"). The coating includes any of the present polymer compositions as disclosed herein. As used herein, "on" includes direct contact or indirect contact between the coating and the conductor. "Direct contact" is a configuration whereby the coating immediately contacts the conductor, with no intervening layer(s) and/or no intervening material(s) located between the coating and the conductor. "Indirect contact" is a configuration whereby an intervening layer(s) and/or an intervening structure(s) or material(s) is/are located between the conductor and the coating. The coating may wholly or partially cover or otherwise surround or encase the conductor. The coating may be the sole component surrounding the conductor. Alternatively, the coating may be one layer of a multilayer jacket or sheath encasing the metal conductor.

In an embodiment, the coated conductor includes an insulating layer containing the present polymeric composition.

In an embodiment, the coated conductor is a power cable operating at a voltage greater than 1 kV, or greater than 6 kV, or greater than 36 kV. FIG. 1 shows an insulated power cable 10 which includes a metallic conductor 12, an internal shielding layer 14, an insulating layer 16, an external shielding layer 18, a metallic screen 20 of wound wires or conducting bands, and an outermost layer, with a sheath 22.

In an embodiment, the internal shielding layer 14 and/or the insulating layer 16 and/or the external shielding layer 18 are/is composed of a polymeric composition containing polyethylene and diphenoxybenzene of the structure (I).

In another embodiment, the internal shielding layer 14 and/or the insulating layer 16 and/or the external shielding layer 18 contains a polymeric composition containing polyethylene and the benzanilide of the structure (II).

The present coated metal conductor may comprise two or more embodiment disclosed herein.

Definitions

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

Any numerical range recited herein, includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range recited herein includes any value or subrange within the stated range. Numerical ranges have been recited, as discussed herein, reference melt index, melt flow rate, and other properties.

The term "alkyl," as used herein, refers to a branched or unbranched, saturated hydrocarbon radical. Nonlimiting examples of suitable alkyl radicals include, for example, methyl, ethyl, n-propyl, i-propyl, n-butyl, t-butyl, i-butyl (or 2-methylpropyl), etc. The alkyls have 1 to 20 carbon atoms.

The term "aryl" or "aryl group," as used herein, is a substituent derived from an aromatic hydrocarbon compound. An aryl group has a total of from six to twenty ring atoms, and has one or more rings which are separate or fused, and may be substituted with alkyl and/or halo groups. The aromatic ring(s) may include phenyl, naphthyl, anthracenyl, and biphenyl, among others.

The term "arylalkyl" or "arylalkyl group," as used herein, is a compound containing both aliphatic and aromatic structures. The term "arylalkyl group" includes "aralkyl groups" (an alkyl group substituted by at least one aryl group) and/or "alkylaryl groups" (an aryl group substituted by at least one alkyl group).

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The "breakdown voltage" of an insulator is the minimum voltage that causes a portion of an insulator to become electrically conductive.

"Cable" and like terms is at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium and high voltage applications. Typical cable designs are illustrated in U.S. Pat. Nos. 5,246,783, 6,496,629 and 6,714,707.

The term "composition," as used herein, includes a mixture of materials which comprise the composition, as well as reaction products and decomposition products formed from the materials of the composition.

"Composition" and like terms mean a mixture or blend of two or more components.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

A "conductor" is an element of elongated shape (wire, cable, fiber) for transferring energy at any voltage (DC, AC, or transient). The conductor is typically at least one metal wire or at least one metal cable (such as aluminum or copper) but may include optical fiber.

"Crosslinked," "cured" and similar terms mean that the polymer, before or after it is shaped into an article, was subjected or exposed to a treatment which induced crosslinking and has xylene or decalene extractables of less than or equal to 90 weight percent (i.e., greater than or equal to 10 weight percent gel content).

An "insulating layer" is a layer having a volume resistivity greater than $10^{10}$ ohm-cm, or greater than $10^{12}$ ohm-cm.

A "layer," as used herein, is polymer based layer surrounding the conductor, for example, an electrically insulating layer, a semiconductive layer, a sheath, a protective layer, a water blocking layer, or a layer performing combined functions, for example, a protective layer charged with a conductive filler.

The term "medium voltage" generally means a voltage of between 6 kV and about 36 kV, whereas "high voltage" means voltages higher than 36 kV, and "extra high voltage" generally means voltages greater than 220 kV. The skilled artisan understands that these general voltage ranges may be different outside of the United States.

The term "polymer" is a macromolecular compound prepared by polymerizing monomers of the same or different type. "Polymer" includes homopolymers, copolymers, terpolymers, interpolymers, and so on. The term "interpolymer" is a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

A "shielding layer" may be semiconductive or resistive. A shielding layer having semiconductive properties has a volumetric resistivity value, of less than 1000 Ω-m, or less than 500 Ω-m, when measured at 90° C. A shielding layer having resistive properties has a volumetric resistivity value greater than a semiconductive shielding layer. A shielding layer having resistive properties typically has a dielectric constant greater than about 10.

Test Methods

Melt index (MI) is measured in accordance with ASTM D 1238-01 test method at 190° C. with a 2.16 kg weight for ethylene-based polymers.

By way of example, and not by limitation, examples of the present disclosure are provided.

EXAMPLES

1. Sample Preparation

Polyethylene homopolymer (0.92 g/cc, MI 2.0 g/10 min) is melt fluxed in a Brabender mixing bowl, after which voltage stabilizing agent is melt-compounded into the polyethylene at a target mix temperature and 30 rpm for 5 minutes to insure adequate incorporation. The polymeric composition is removed from the mixing bowl and compression molded into a slab that is 0.25 inches thick. Compression molding is achieved using a pressure of 300-500 psi and a temperature of 140° C. for 3 minutes, after which the pressure is increased above 2000 psi while maintaining the sample at 140° C. for an additional 3 minutes. The high pressure is then maintained while the sample cools.

1 inch square specimens are die-cut from the slab and pre-drilled to a depth of 0.5 inches along one of the major axes. Steel needles (60° cone, 3 micron tip radius) are inserted into the pre-drilled holes and placed into a jig to complete the insertion at elevated temperature. The entire jig is conditioned in a circulating air oven for 1 hour at 105° C., after which the needle is advanced into the softened polymer at a rate of approximately 1 mm every 5 minutes while remaining in the 105° C. oven. The needles are advanced to a stop which produces a point-to-plane distance of approximately 1.9 mm.

A series of specimens are energized to an applied 6 kV 60 Hz voltage for 30 minutes, followed by an increase in the applied voltage of 1 kV every 30 minutes up to a maximum 18 kV test voltage. The breakdown voltage for each specimen is recorded for evaluation of the characteristic voltage as the scale parameter of a fitted Weibull failure distribution.

Example 1 is LDPE containing 2.9 wt % diphenoxybenzene (molar equivalent to 2 wt % of anthracene), available from Sigma Aldrich, prepared with a mix temperature of 140° C.

Example 2 is LDPE containing 2.2 wt % benzanilide (molar equivalent to 2 wt % of anthracene), available from Sigma Aldrich, prepared with a mix temperature of 190° C.

Comparative Sample A is LDPE with no voltage stabilizing agent mixed at a temperature of 140° C.

Comparative Sample B is LDPE containing no voltage stabilizing agent, compounded at 225° C.

Comparative Sample C is LDPE containing 2 wt % anthracene, mixed at a temperature of 225° C.

Comparative Sample A

Figure 2:
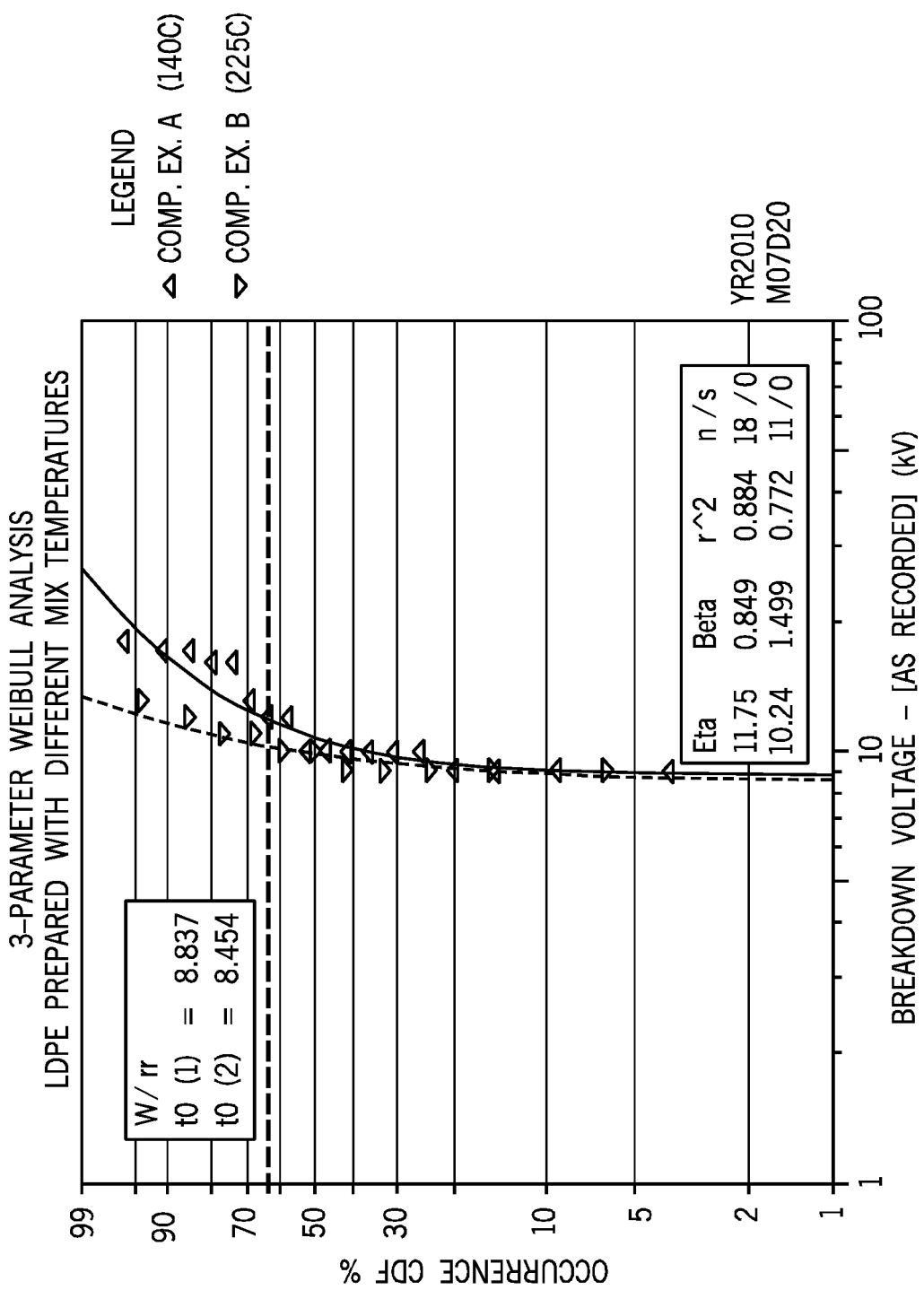
FIG. 2 is a Weibull analysis for LDPE prepared at different mix temperatures.

A series of 18 specimens of Comparative Sample A are fit to a 2-parameter Weibull failure distribution. The data exhibits significant non-linearity leading to poor correlation (r^2 of 0.75). A 3-parameter Weibull failure distribution is found to be better suited to describe the failure distribution (r^2 of 0.88), with an offset t0=8.8 kV. A 3-parameter Weibull characteristic voltage of 11.7 kV is determined for Comparative Sample A, with a 90% confidence interval which spanned 10.7 to 13.7 kV, as shown in FIG. 2.

Comparative Sample B

As a means to demonstrate any impact of performance on mix temperature, Comparative Sample B includes the evaluation of 11 specimens prepared with elevated mix temperature (225° C. compared to 140° C. used in Comparative Sample A). As shown in FIG. 2, the 3-parameter Weibull distribution (r^2=0.77) yields a characteristic voltage of 10.2 kV (90% confidence interval of 9.6 to 11.4 kV) with an offset of t0=8.5 kV. The characteristic voltage appears to have been reduced slightly by the elevated mix temperature, yet the difference is not statistically significant. However, it does suggest that Comparative Sample A represents a conservative baseline for the determination of potential improvements to the characteristic voltage for any materials compounded at temperatures between 140 and 225° C.

Comparative Sample C

Comparative Sample C is LDPE containing 2 wt % anthracene, which has been prepared using a mix temperature of 225° C. Eight specimens were evaluated to determine the characteristic voltage of 16.3 kV (90% confidence interval ranging from 15.3 to 17.2 kV), which is well above the characteristic voltage of Comparative Examples A and B. This performance is consistent with expectations, as anthracene is a known voltage stabilizing agent.

Example 1

A series of 7 specimens of Example 1 are evaluated, yet four of the seven specimens survived the entire test program through the maximum 18 kV applied voltage. (None of the LDPE samples survived the entire program through 18 kV). When fit to a similar 3-parameter Weibull distribution (the three failures of course achieve a perfect fit), a characteristic voltage of nearly 47 kV is estimated. Using a more reasonable 2-parameter model ($r^2=0.94$), the characteristic voltage for Example 1 is estimated to be 23.9 kV (90% confidence interval of 16.4-51.3 kV).

A comparison of the lower confidence bound of Example 1 (16.4 kV) with the upper confidence bound of Comparative Sample A (13.7 kV) indicates the voltage stabilizing nature of the present composition.

Example 2

Example 2 is LDPE containing 2.2 wt % benzanilide (molar equivalent to 2 wt % of anthracene), available from Sigma Aldrich, prepared with a mix temperature of 190° C. Eight specimens are evaluated, and three survived the maximum voltage step of 18 kV. The 3-parameter Weibull distribution ($r^2=0.92$) yields a characteristic voltage of 29 kV and an offset of $t0=9.8$ kV, with a 90% confidence interval spanning 13.5 to 77 kV.

The improved characteristic voltage performance of Example 2 relative to Comparative Samples A and B is clear. Although the conservative comparison of Example 2 with Comparative Sample A does indicate slight overlap between the 90% confidence intervals, it is clear that statistically significant separation would exist at just under a 90% confidence level with the data generated.

While significant overlap exists between the failure distributions of Example 2 and Comparative Sample C, it should be noted that none (0 of 8) of the specimens from Comparative Sample C survived the entire duration of the needle test through the 18 kV maximum test voltage. However, three (3 of 8) of Example 2 survived the test protocol throughout the maximum 18 kV test voltage.

None of the specimens from Comparative Sample A (0 of 18) survived the test protocol throughout the maximum 18 kV test voltage.

It can be concluded that the inventive composition, Example 2, therefore, provides increased breakdown strength over that of Comparative Samples A and B.

It is specifically intended that the present disclosure not be limited to the embodiments and illustrations contained herein, but include modified forms of those embodiments including portions of the embodiments and combinations of elements of different embodiments as come within the scope of the following claims.

I claim:

1. A coated conductor comprising:
   a conductor; and
   a coating on the conductor, the coating comprising a polymeric composition, the polymeric composition comprising:
   a polyolefin; and
   from about 0.1 wt % to about 3 wt % of a diphenoxybenzene of the structure (I)

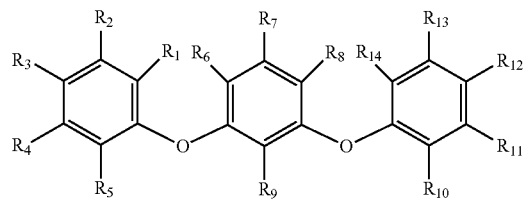

wherein $R_1$-$R_{14}$ are the same or different, each of $R_1$-$R_{14}$ is selected from the group consisting of hydrogen, an unsubstituted $C_1$-$C_{20}$ hydrocarbyl group, and combinations thereof, and wherein the unsubstituted $C_1$-$C_{20}$ hydrocarbyl group contains only carbon and hydrogen atoms.

2. The coated conductor of claim 1 wherein the polyolefin of the polymeric composition is a polyethylene.

3. The coated conductor of claim 1 wherein the polyolefin of the polymeric composition is a crosslinked polyethylene.

4. The coated conductor of claim 1 wherein at least one of $R_1$-$R_{14}$ of structure (I) of the diphenoxybenzene of the polymeric composition is $C_1$-$C_{20}$ hydrocarbyl group.

5. A coated conductor comprising:
   a conductor; and
   a coating on the conductor, the coating comprising a polymeric composition, the polymeric composition comprising:
   a polyolefin; and
   from about 0.1 wt % to about 3 wt % of a diphenoxybenzene of the structure (I)

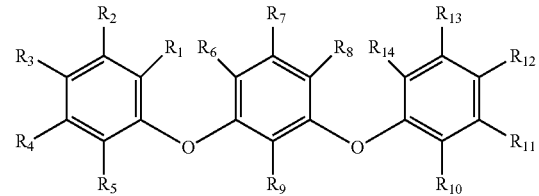

wherein each of $R_1$-$R_{14}$ of structure (I) of the diphenoxybenzene of the polymeric composition is hydrogen.

* * * * *